(12) United States Patent
Valentine et al.

(10) Patent No.: US 6,219,546 B1
(45) Date of Patent: Apr. 17, 2001

(54) SYSTEM AND METHOD OF REALLOCATING SATELLITE GATEWAYS IN A RADIO TELECOMMUNICATIONS NETWORK

(75) Inventors: Eric Valentine, Plano; Vladimir Alperovich, Dallas, both of TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/120,711

(22) Filed: Jul. 22, 1998

(51) Int. Cl.$^7$ ....................................................... H04Q 7/20
(52) U.S. Cl. ........................ 455/428; 455/417; 455/430; 455/433; 455/445; 455/423
(58) Field of Search ............................... 455/428, 427, 455/430, 12.1, 13.1, 423, 424, 417, 445, 433, 413

(56) References Cited

U.S. PATENT DOCUMENTS

| | | | |
|---|---|---|---|
| 5,890,679 | * | 4/1999 | Chethik .............................. 244/158 R |
| 6,049,714 | * | 4/2000 | Patel ....................................... 455/433 |
| 6,070,073 | * | 5/2000 | Maveddat et al. .................... 455/428 |
| 6,072,768 | * | 6/2000 | Wiedman et al. ..................... 370/58 |

\* cited by examiner

*Primary Examiner*—Dwayne Bost
*Assistant Examiner*—Temica M. Davis
(74) *Attorney, Agent, or Firm*—Arthur I. Navarro

(57) ABSTRACT

A method of handling an incoming call to a mobile station (MS) in a radio telecommunications network having a gateway mobile switching center (G-MSC) and a home location register (HLR), and the MS communicates with the network via a satellite link comprising a satellite and a satellite gateway. The method includes storing in the HLR, a plurality of primary gateways and an associated backup gateway for each primary gateway in the network. If the primary gateway serving the MS fails while the satellite is still operational, the incoming call is routed from the G-MSC to the backup gateway. The backup gateway's base station subsystem (BSS) is reconfigured to cover the service area of the primary gateway, and the MS is notified that the backup gateway has replaced the primary gateway as the MS's serving gateway. Subscriber data for the called MS is provided to the backup gateway by the HLR. If the satellite fails, the HLR instructs the G-MSC to route the call directly to voice mail when the HLR receives a request for routing information from the G-MSC.

14 Claims, 3 Drawing Sheets

SYSTEM AND METHOD OF REALLOCATING SATELLITE GATEWAYS IN A RADIO TELECOMMUNICATIONS NETWORK

BACKGROUND OF THE INVENTION

1. Technical Field of the Invention

This invention relates to telecommunication systems and, more particularly, to a system and method of reallocating satellite gateways when a gateway or satellite radio link becomes inoperative in a radio telecommunications network.

2. Description of Related Art

In some areas of the world, transmissions to and from mobile stations are routed through communication satellites. The satellites are typically distributed either in geosynchronous orbit or mid-earth orbit. When in geosynchronous orbit, a single geosynchronous satellite (such as Thuraya, EAST, APMT, etc.) provides radio access between the radio telecommunications network and its mobile stations (MSs). When satellites are placed in mid-earth orbit, a constellation of satellites is required in order to provide continuous coverage of the service area of the telecommunications network since individual satellites move into and out of the service area.

Communications between satellites and the radio telecommunications network are routed through satellite gateways. Each gateway is responsible for providing telecommunications services to mobile stations in a particular geographic region. Two types of failures can occur which adversely impact the delivery of telecommunications services. The first type of failure is a ground failure which involves the loss of a gateway which communicates with one or more satellites. The loss of a gateway causes a loss of telephone service to all of the MSs in the service area of the failed gateway. Radio telecommunications services to the rest of the network may not be affected since the satellites and other gateways are still operational.

A second type of failure is experienced when a satellite becomes either completely disabled, or partially disabled. Alternatively, the link between the gateway and the satellite may be degraded for a number of reasons such as a misalignment or pointing error in the satellite antennas pointing at the ground, attenuation of the signal due to weather or atmospheric conditions, or misalignment of the satellite's solar arrays which cause loss of power. The effects of this type of failure vary since MS terminating traffic into the gateway may be more than can be handled by the available radio resources. For example, there may not be sufficient bandwidth or power on the link to perform paging, obtain page responses, and set up traffic channels. Since the gateway is still operational, but the satellite is not, the gateway attempts to set up the call in the normal manner through the satellite. The gateway sends out paging messages, but the MS is never paged by the satellite, and the call fails. When the paging timer times out, the call may be forwarded to voice mail. Unfortunately, this takes a long time, and there is a high rate of call abandonment as a result.

If the satellite is completely disabled, and the satellite is in a geosynchronous orbit, then effectively all radio access is lost for the network users. If the satellite is completely disabled, and the satellite is in a mid-earth orbit, then services may be lost or degraded whenever the failed satellite is over the network's service area. If the satellite is partially disabled, or experiences a mispointing error, the problem may affect the quality of the radio interface, while not preventing communications entirely. In that case, the traffic load from the network into the gateways may be more than the satellite can pass to the mobile stations. Additionally, for mobile-originated calls, a problem may arise in the network with alarms that are triggered when call failures due to radio problems exceed a defined threshold. The network's operations and maintenance (O&M) system could thus be flooded with alarms which would contain no useful information.

There are no known prior art teachings of a solution to the aforementioned deficiency and shortcoming such as that disclosed herein.

In order to overcome the disadvantage of existing solutions, it would be advantageous to have a method of re-routing calls through a backup satellite gateway whenever a gateway fails. In addition, in the event of a satellite failure or degradation of the satellite radio link, the method would rapidly recognize the problem and forward calls to voice mail prior to call abandonment. The present invention provides such a method.

SUMMARY OF THE INVENTION

In one aspect, the present invention is a method of reconfiguring a radio telecommunications network to provide service to a mobile station (MS). The MS communicates with the network via a satellite and a satellite gateway, and the method reconfigures the network to provide service to the MS when the gateway fails. The method includes the steps of storing in a home location register (HLR) a plurality of primary gateways, and an associated backup gateway for each primary gateway in the network; notifying the HLR that the primary gateway serving the MS has failed; and selecting, by the HLR, the associated backup gateway to serve the MS. The method also includes reconfiguring the backup gateway to cover the service area of the primary gateway, and notifying the MS that the backup gateway has replaced the primary gateway as the MS's serving gateway. The method may also include storing a location area for the MS in the HLR whenever the MS performs a location update, and sending the location area from the HLR to the backup gateway to facilitate paging the MS.

In another aspect, the present invention is a method of re-routing an incoming call to the MS when the gateway fails. The method includes the steps of storing in a home location register (HLR) a plurality of primary gateways, and an associated backup gateway for each primary gateway in the network; notifying the HLR that the primary gateway serving the MS has failed; and selecting, by the HLR, the associated backup gateway to serve the MS. The method also includes reconfiguring the backup gateway to cover the service area of the primary gateway; notifying the MS that the backup gateway has replaced the primary gateway as the MS's serving gateway; receiving the incoming call in a gateway mobile switching center (G-MSC); and requesting, by the G-MSC, routing information from the HLR. This is followed by requesting, by the HLR, a routing number from the backup gateway serving the called MS; providing, by the HLR, subscriber data for the called MS to the backup gateway; returning, by the backup gateway, a routing number to the HLR; returning, by the HLR, the routing number to the G-MSC; and routing the call from the G-MSC to the backup gateway.

In yet another aspect, the present invention is a method of routing an incoming call for the MS to voice mail when the satellite fails. The method includes reporting to the HLR that the satellite has failed; receiving the incoming call in a gateway mobile switching center (G-MSC); and requesting, by the G-MSC, routing information from the HLR. This is followed by returning an instruction from the HLR to the G-MSC to route the call to voice mail; and immediately routing the call to voice mail by the G-MSC. In a radio telecommunications network in which the G-MSC is connected to the HLR via the failed satellite link, the method includes the steps of instructing the G-MSC to route all calls requiring access to the HLR directly to voice mail; receiving an incoming call in the G-MSC which requires access to the HLR; and immediately routing the call to voice mail by the G-MSC.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

In the present invention, when a satellite gateway fails, the satellite is accessed through a backup gateway which is still operational. When a satellite fails or the radio link is degraded, the present invention recognizes the problem early, and immediately forwards the call to voice mail. The present invention is applicable whether satellites are geostationary or in mid-earth orbit.

Figure 1:
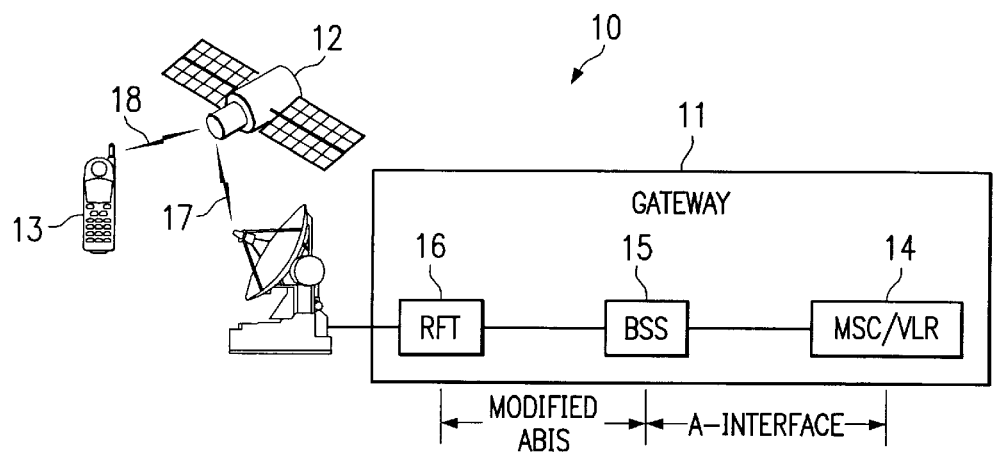
FIG. 1 (Prior Art) is a simplified block diagram of the link between a satellite gateway and a mobile station in an existing radio telecommunications network.

FIG. 1 is a simplified block diagram of the link between a satellite gateway 11 and a mobile station (MS) 13 in an existing radio telecommunications network 10. The link is shown to include the satellite gateway 11, a communication satellite 12, and the MS 13. Within the gateway 11, a Mobile Switching Center/Visitor Location Register (MSC/VLR) 14 is connected to a Base Station Subsystem (BSS) 15 via an A-interface. The BSS 15 is modified for use with satellites, and is connected to a Radio Frequency Terminal (RFT) 16 via, for instance, a modified Abis interface. The RFT 16 includes an antenna system for tracking and communicating with the satellite 12. The satellite 12 provides an air interface link from the gateway 11 to the MS 13. The uplink 17 (from the gateway to the satellite 12) is in the Ku-band. The downlink 18 (from the satellite 12 to the MS) is in the L-band.

Figure 2:
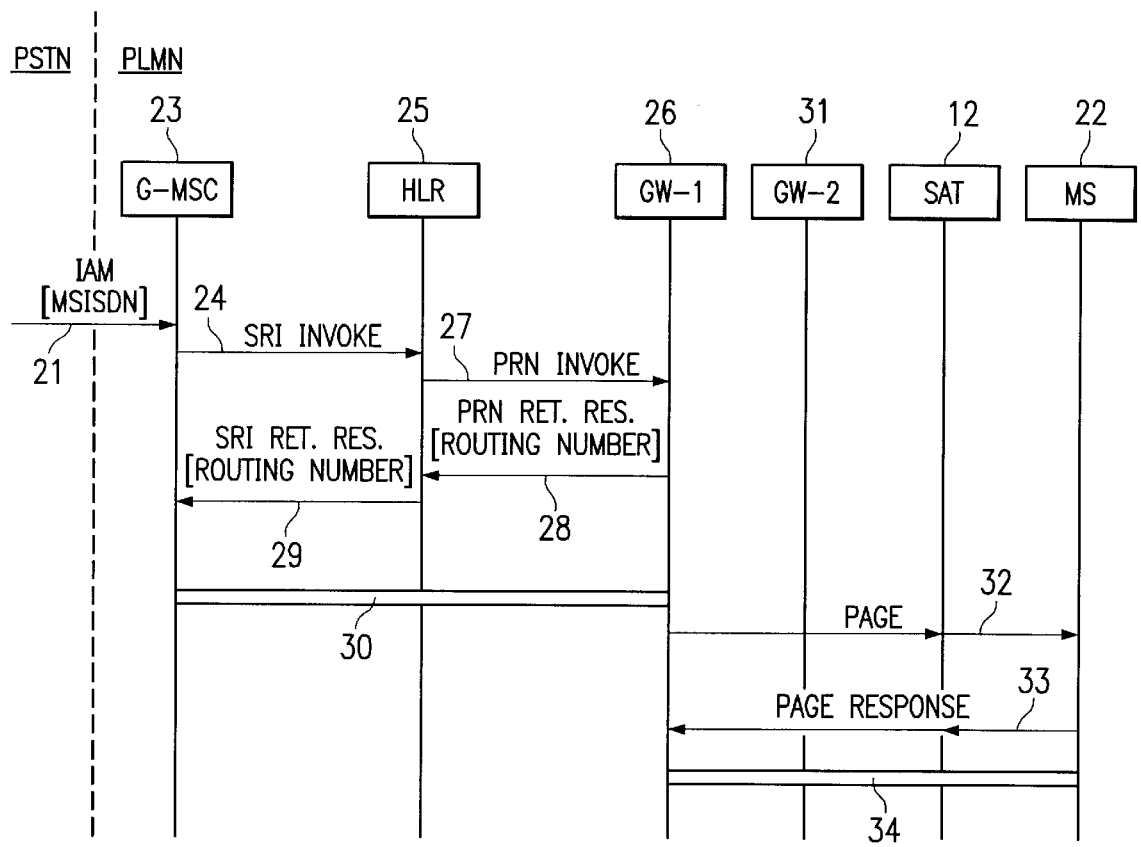
FIG. 2 (Prior Art) is a message flow diagram illustrating the flow of messages between the nodes of the telecommunications network of FIG. 1 when a mobile-terminating call is routed to a mobile station.

FIG. 2 is a message flow diagram illustrating the flow of messages between the nodes of the telecommunications network of FIG. 1 when a mobile-terminating call 21 is routed to a MS 22. The MS-terminating call may originate in the Public Switched Telephone Network (PSTN) and enter the Public Land Mobile Network (PLMN) in an ISUP Initial Address Message (IAM). The IAM includes the directory number of the called MS (MSISDN). The call enters the network through a Gateway Mobile Switching Center (G-MSC) 23. The G-MSC then sends a Send Routing Information (SRI) Invoke message 24 to a Home Location Register (HLR) 25 requesting routing information for the called MS.

In the Global System for Mobile Communications (GSM), the address of the VLR where the MS 22 is registered is stored in the HLR 25. The HLR 25 determines that the last reported location of the MS 22 was in the service area of Gateway-1 (GW-1) 26, and sends a Provide Routing Number (PRN) Invoke message 27 to GW-1 26. GW-1 then 26 sends a PRN Return Result message 28 to the HLR and includes a routing number for the called MS 22. The HLR 25 then sends a SRI Return Result message 29 to the G-MSC 23 and includes the routing number. The G-MSC 23 then routes the call to GW-1 26 at 30.

GW-1 26 then sends a page request 32 to the MS 22 via the satellite 12, as shown in FIG. 1. If the MS 22 is available, it sends a page response 33 back to GW-1 which then routes the call to the MS at 34. Gateway-2 (GW-2) 31 is not involved in this example, but represents the fact that the network may include additional gateways.

A problem arises, however, when GW-1 26 fails, and a routing number can no longer be obtained from GW-1 26. In existing networks, this results in the loss of telephone service to all of the MSs in the service area of GW-1 26.

Figure 3:
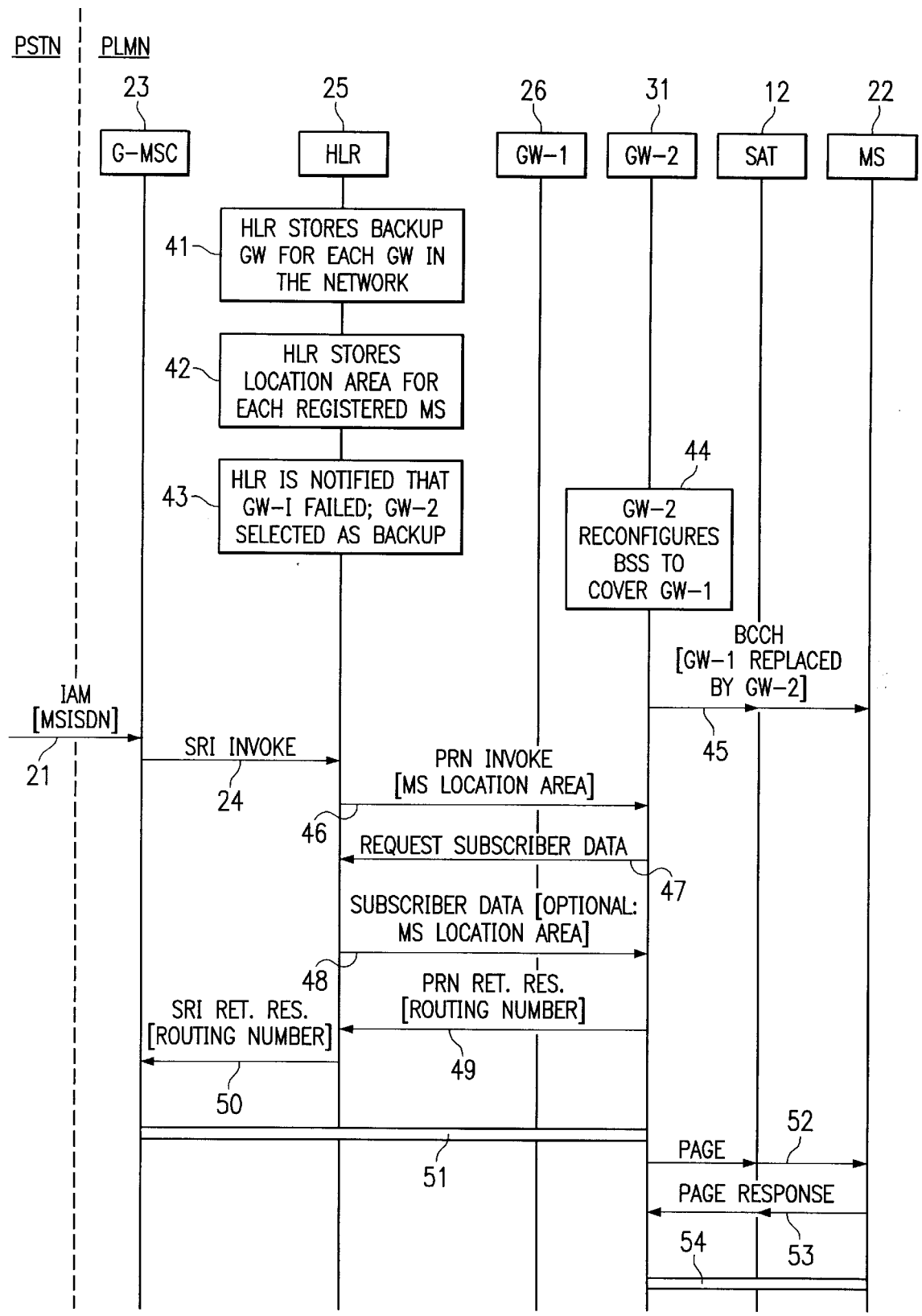
FIG. 3 is a message flow diagram illustrating the modified flow of messages between the nodes of a telecommunications network in accordance with the teachings of the present invention when a satellite gateway fails.

FIG. 3 is a message flow diagram illustrating the modified flow of messages between the nodes of a telecommunications network in accordance with the teachings of the present invention when a satellite gateway fails. In this solution, the HLR 25 stores a backup gateway for each gateway in the network. When it is noticed that a gateway has gone down, traffic to subscribers registered in that gateway is instead directed to the backup gateway whose BSS has been re-tuned to cover the area covered by the failed gateway. To work most efficiently, location information at Location Update should also be stored in the HLR 25.

Radio telecommunications networks that utilize satellite links include a satellite resource management system which includes satellite ephemeris data as well as primary and backup radio frequency plans. The data and plans are downloaded gateway-to-gateway so that at any given time, for a particular spot on the earth, every gateway knows which satellites can reach the spot, and which frequency should be utilized. In the preferred embodiment, each gateway has a single backup gateway. In an alternative embodiment, the HLR knows location areas, so a proper gateway using the proper satellite is chosen. The selection can also be based on time of day or traffic loading in each gateway.

Referring to FIG. 3, it is assumed that both GW-1 26 and GW-2 31 have visibility to the satellite 12. At 41, the HLR 25 stores a backup gateway for each gateway in the network. In this example, GW-2 31 is stored as a backup to primary gateway, GW-1 26. Preferably, whenever a MS 22 performs a Location Update, the location area of the MS 22 is stored in the HLR 25 at 42. When GW-1 26 fails at 43, the HLR 25 is notified of the failure by the system operator or other known methods. At this point, the HLR 25 selects GW-2 31 as the backup for GW-1 26.

The BSS in GW-2 31 is then reconfigured at 44 to cover the area previously covered by GW-1 26. In addition, GW-2 31 adds information to the broadcast channel (BCCH) at 45 informing the called MS 22 that there has been a gateway failure, and GW-1 26 has been replaced by GW-2 31. This is done so that the called MS 22 will respond to pages from GW-2 31. When a MS 22 is paged, the paging message includes a mobile station identification number (MSISDN) or a Temporary Mobile Station Identity (TMSI) and a system identification number utilized as a gateway identifier. This combination uniquely identifies the paging message across the entire network. The MS 22 listens for a match, and will not respond to a page unless the proper identifier is used. Therefore, if GW-1 26 goes down, and GW-2 31 pages for the MS, the paging message has the wrong identifier 22, and the MS 22 will not respond. To overcome this problem, the present invention notifies the MS 22 over the BCCH that GW-1 26 has been replaced by GW-2 31.

When a MS terminating 22 call 21 comes into the network through the G-MSC 23, the G-MSC 23 sends a SRI Invoke message 24 to the HLR 25 requesting routing information. The HLR then sends a PRN Invoke message 46 to GW-2 31. If the MS's location area has been stored in the HLR 25, it may also be sent to GW-2 31 in the PRN Invoke message 46.

Location areas in cellular networks are generally clusters of cells. Each cell may be assigned a cell identifier that is coordinated across the network. Alternatively, location areas may be assigned location-area identifiers that are coordinated across the network. In satellite systems, the satellite has a number of spot beams (for example, 540 spot beams) that are utilized for paging purposes. The location areas may be defined in the network in terms of satellite spot beams which are defined for all satellites to cover a defined geographic area.

There is a slight chance that GW-1 26 and GW-2 31 could have both allocated the same TMSI to two different MSs at the same time, since each TMSI is only unique within the particular gateway which assigns it. Thus, when an MS from GW-1 26 is told to respond to pages from GW-2 31, it may respond to a page intended for a MS in GW-2 31 with the same TMSI. However, the chance of this occurrence is extremely remote, and differences in geographic location should normally prevent this from happening.

When GW-2 31 receives the PRN Invoke message 46 from the HLR 25, GW-2 31 finds no VLR record in its MSC/VLR for the called MS 22. Therefore, GW-2 31 requests subscriber data from the HLR 25 at 47 which returns the data to GW-2 31 at 48. The MS's location area may be passed at this time if it was not passed in the PRN Invoke message 46. GW-2 31 then provides the routing number to the HLR 25 in a PRN Return Result message 49.

The routing number is returned to the G-MSC 23 in a SRI Return Result message 50. The G-MSC 23 then routes the call to GW-2 31 at 51. GW-2 31 then sends a page 52 to the MS 22 in the proper location area. The MS 22 recognizes the gateway identifier for GW-2 31 as the identifier for its serving gateway, and sends a page response 53. The call is then connected at 54.

Figure 4:
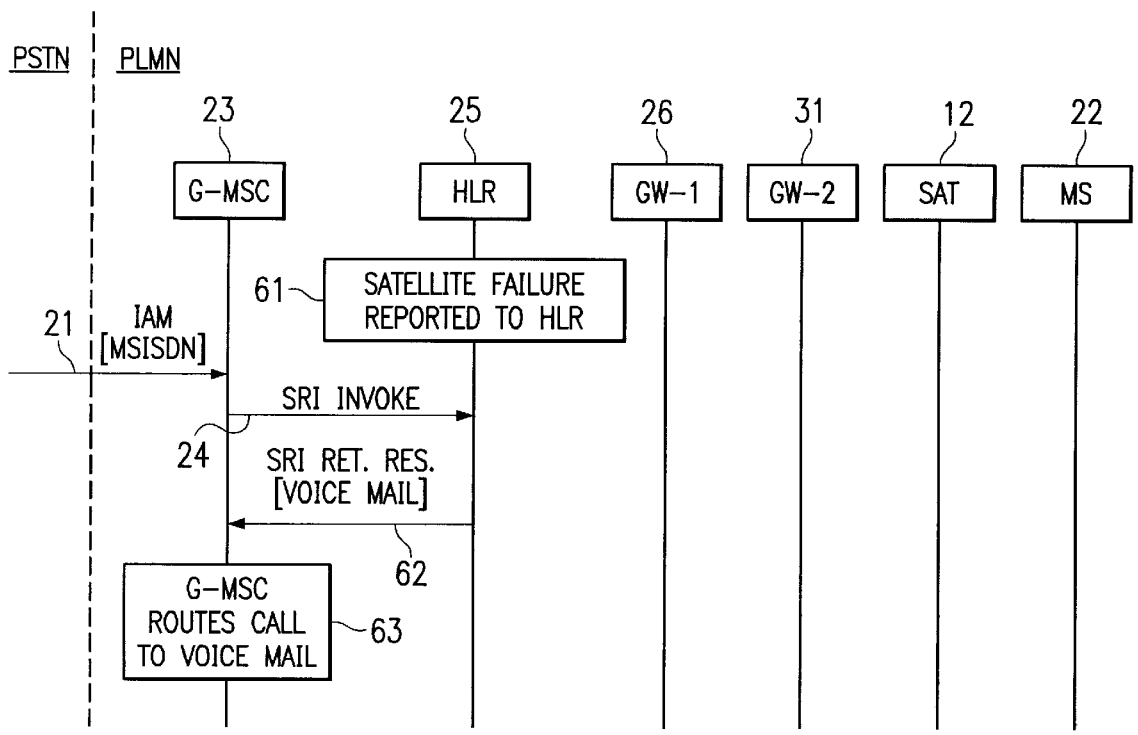
FIG. 4 is a message flow diagram illustrating the modified flow of messages between the nodes of a telecommunications network in accordance with the teachings of the present invention when a satellite fails or a radio link is degraded.

FIG. 4 is a message flow diagram illustrating the modified flow of messages between the nodes of a telecommunications network in accordance with the teachings of the present invention when a satellite fails or a radio link is degraded. As noted above, when a satellite fails or the radio link is degraded, the present invention recognizes the problem early, and immediately forwards the call to voice mail. This may be accomplished by reporting the satellite failure to the HLR 25 at 61. Thereafter, when a mobile-terminating call 21 is received by the G-MSC 23, and the FUR 25 receives a SRI Invoke message 24 from the G-MSC, the HLR immediately recognizes that there is a satellite problem, and sends back a SRI Return Result message 62 to the G-MSC 23 instructing the G-MSC 23 to route the call to voice mail. Accordingly, the G-MSC 23 then routes the call to voice mail. This procedure prevents the long delays which exist in the prior art, and which often result in calls being abandoned.

In some widely dispersed networks, the link between the G-MSC and the HLR is also over the satellite. Therefore, if the satellite fails, there is no way for the G-MSC to request or receive the routing instructions from the HLR. In this case, the system operator may utilize an Operations and Maintenance (O&M) interface to instruct the G-MSC to immediately forward to a general voice mail box, all calls requiring access to the unreachable HLR. The O&M interface may be by Internet, X.25, by manual input, etc.

Figure 5:
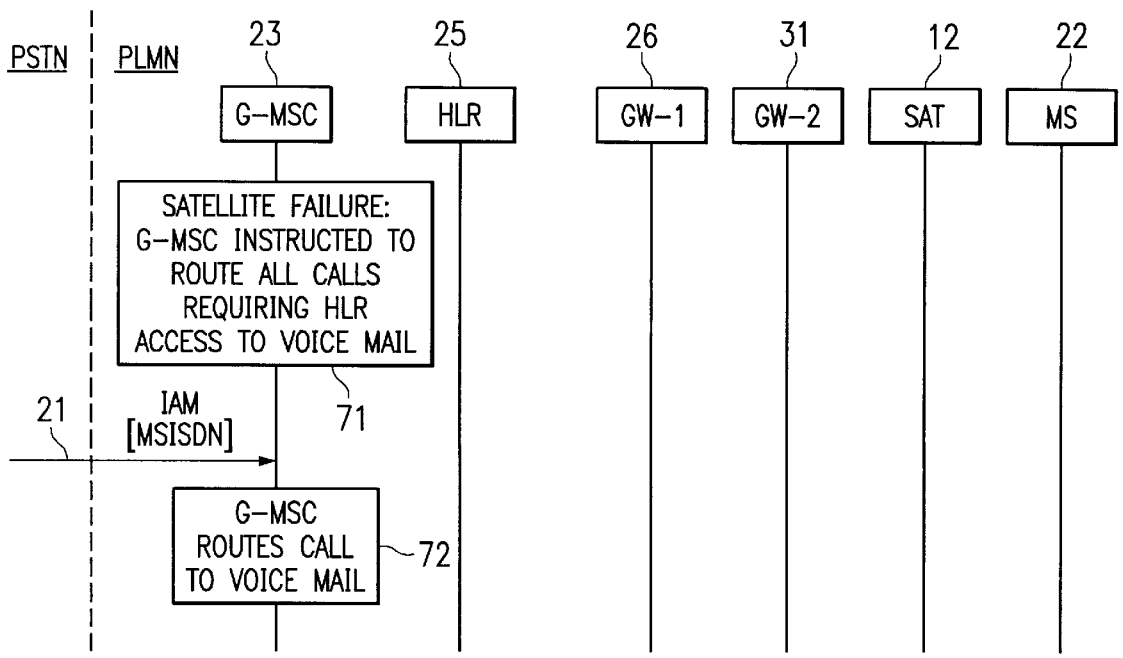
FIG. 5 is a message flow diagram illustrating the actions taken by a Gateway Mobile Switching Center (G-MSC) in accordance with the teachings of the present invention when a satellite link fails between the G-MSC and a Home Location Register (HLR).

FIG. 5 is a message flow diagram illustrating the actions taken by the G-MSC 23 in accordance with the teachings of the present invention when a satellite link fails between the G-MSC 23 and the HLR 25. At 71, a satellite failure is reported, and the system operator instructs the G-MSC 23 to immediately forward to a general voice mail box 72, all calls requiring access to the unreachable HLR 25. Thereafter, when a mobile-terminating call 21 is received by the G-MSC 23, the G-MSC immediately routes the call to voice mail. This rapid routing to voice mail prevents long delays which often resulted in abandoned calls in the prior art.

It is thus believed that the operation and construction of the present invention will be apparent from the foregoing description. While the method shown and described has been characterized as being preferred, it will be readily apparent that various changes and modifications could be made therein without departing from the spirit and scope of the invention as defined in the following claims.

What is claimed is:

1. In a radio telecommunications network in which a mobile station (MS) communicates with the network via a satellite and a satellite gateway, a method of reconfiguring the network to provide service to the MS when the gateway fails, said method comprising the steps of:

storing in a home location register (HLR) the identification for a plurality of primary gateways and for an associated backup gateway for each primary gateway in the network;

storing a location area for the MS in the HLR whenever the MS performs a location update;

sending the location area from the HLR to the backup gateway;

notify the HLR that the primary gateway serving the MS has failed;

selecting, by the HLR, the associated backup gateway to serve the MS;

reconfiguring the backup gateway to cover the service area of the primary gateway; and notifying the MS that the backup gateway has replaced the primary gateway as the MS's serving gateway.

2. The method of reconfiguring a network to provide service to a MS of claim 1 wherein the step of storing a location area for the MS in the HLR includes storing a location area with a unique location area identifier that is recognized throughout the network.

3. The method of reconfiguring a network to provide service to a MS of claim 1 wherein the step of storing a location area for the MS in the HLR includes storing a location area which is associated with a satellite spot beam that is recognized throughout the network.

4. The method of reconfiguring a network to provide service to a MS of claim 1 wherein the step of reconfiguring the backup gateway to cover the service area of the primary includes reconfiguring a base station subsystem serving the backup gateway to cover the service area of the primary gateway.

5. The method of reconfiguring a network to provide service to a MS of claim 1 wherein the step of notifying the MS that the backup gateway has replaced the primary gateway includes broadcasting that the backup gateway has replaced the primary gateway on the broadcast control channel (BCCH).

6. In a radio telecommunications network in which a mobile station (MS) communicates with the network via a satellite and a satellite gateway, a method of rerouting an incoming call the MS when the gateway fails, said method comprising the steps of:

storing in a home location register (HLR) a set of bits indicating a plurality of primary gateways, and an associated backup gateway for each primary gateway in the network;

storing a location area for the MS in the HLR whenever the MS performs a location update;

sending the location area from the HLR to the backup gateway;

notify the HLR that the primary gateway serving the MS has failed;

selecting, by the HLR, the associated backup gateway to serve the MS;

reconfiguring the backup gateway to cover the service area of the primary gateway; and notifying the MS that the backup gateway has replaced the primary gateway as the MS's serving gateway;

receiving the incoming call in a gateway mobile switching center (G-MSC);

requesting, by the HLR, a routing number from the backup gateway serving the called MS;

providing, by the HLR, subscriber data for the called MS to the backup gateway;

returning, by the backup gateway, a routing number to the HLR;

returning, by the HLR, the routing number to the G-MSC; and routing the call from the G-MSC to the backup gateway.

7. The method of reconfiguring a network to provide service to a MS of claim 6 wherein the step of requesting, by the HLR, a routing number from the backup gateway serving the called MS includes sending a routing number request message from the HLR to the backup gateway, the routing number request message including a location area for the called MS.

8. The method of reconfiguring a network to provide service to a MS of claim 6 wherein the step of providing, by the HLR, subscriber data for the called MS to the backup gateway includes providing a location area for the called MS.

9. The method of re-routing an incoming call to an MS of claim 6 further comprising the steps of:

sending a paging message from the backup gateway to the called MS, the paging message including a system identification number for the backup gateway;

recognizing by the called MS, the system identification number for the backup gateway as a gateway identifier for the MS's serving gateway;

sending a page response from the called MS to the backup gateway; and completing the call to the called MS.

10. The method of re-routing an incoming call to an MS of claim 9 wherein the step of notifying the MS that the backup gateway has replaced the primary gateway includes broadcasting that the backup gateway has replaced the primary gateway on the broadcast control channel (BCCH).

11. In a radio telecommunications network in which a mobile station (MS) communicates with the network via a satellite and a satellite gateway, and subscriber data and location information for the MS is stored in a home location register (HLR), and a link between a gateway mobile switching center (G-MSC) being over the satellite, a method of routing an incoming call for the MS to voice mail when the satellite fails, said method comprising the steps of:

reporting to the HLR that the satellite has failed;

receiving the incoming call in the gateway mobile switching center (G-MSC);

requesting, by the G-MSC, routing information from the HLR;

upon an indication of satellite failure, returning an instruction from the HLR to the G-MSC to route the call to voice mail; and immediately routing the call to voice mail by the G-MSC thereby preventing delays, and abandonment of calls.

12. A method of handling an incoming call to a mobile station (MS) in a radio telecommunications network having a gateway mobile switching center (G-MSC) and a home location register (HLR) in which subscriber data and location area information for the MS is stored, said MS communicating with the network via a satellite link comprising a satellite and a satellite gateway, said method comprising the steps of:

storing in a home location register (HLR) a plurality of primary gateways, and an associated bachup gateway for each primary gateway in the network;

determining whether the primary gateway serving the MS has failed while the satellite is still operational;

upon determining that the primary gateway serving the MS has failed while the satellite is still operational, performing the steps of:

instructing the HLR to switch to the associated backup gateway for the MS;

reconfiguring the backup gateway to cover the service area of the primary gateway;

notifying the MS that the backup gateway has replaced the primary gateway as the MS's serving gateway;

providing, by the HLR, subscriber data for the called MS to the backup gateway;

routing the call from the G-MSC to the backup gateway; and completing the call to the MS from the backup gateway;

determining whether the satellite serving the MS has failed; and upon determining that the satellite serving the MS has failed, routing the call to voice mail by the G-MSC.

13. The method of handling an incoming call to a MS of claim 12 wherein the step of routing the call to voice mail by the G-MSC includes the steps of:

reporting to the HLR that the satellite has failed;

receiving the incoming call in the G-MSC;

requesting, by the G-MSC, routing information from the HLR;

returning an instruction from the HLR to the G-MSC to route the call to voice mail.

14. The method of handling an incoming call to a MS of claim 12 wherein the G-MSC is connected to the HLR via the satellite link, and the step of routing the call to voice mail by the G-MSC includes the steps of:

instructing the G-MSC to route all calls requiring access to the HLR directly to voice mail;

receiving an incoming call in the G-MSC which requires access to the HLR; and immediately routing the call to voice mail by the G-MSC.

\* \* \* \* \*